(12) United States Patent  
Liu

(10) Patent No.: US 11,910,355 B2
(45) Date of Patent: Feb. 20, 2024

(54) METHOD AND DEVICE OF TRANSMITTING INFORMATION AND BASE STATION

(71) Applicant: BEIJING XIAOMI MOBILE SOFTWARE CO., LTD., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 569 days.

(21) Appl. No.: 17/257,825

(22) PCT Filed: Jul. 4, 2018

(86) PCT No.: PCT/CN2018/094438
§ 371 (c)(1),
(2) Date: Jan. 4, 2021

(87) PCT Pub. No.: WO2020/006695
PCT Pub. Date: Jan. 9, 2020

(65) Prior Publication Data
US 2021/0297986 A1 Sep. 23, 2021

(51) Int. Cl.
*H04L 5/00* (2006.01)
*H04W 68/02* (2009.01)
*H04W 72/23* (2023.01)

(52) U.S. Cl.
CPC .......... *H04W 68/02* (2013.01); *H04W 72/23* (2023.01)

(58) Field of Classification Search
None
See application file for complete search history.

(56) References Cited

U.S. PATENT DOCUMENTS

| 10,952,033 | B2 * | 3/2021 | Chen | H04W 72/23 |
| 11,006,443 | B2 * | 5/2021 | Tie | H04W 4/06 |
| 11,576,147 | B2 * | 2/2023 | Liu | H04W 68/025 |
| 11,737,040 | B2 * | 8/2023 | Shreevastav | H04W 56/0005 370/329 |
| 2011/0086608 | A1 | 4/2011 | Yamagishi et al. | |
| 2017/0367070 | A1 * | 12/2017 | Zhang | H04L 12/1895 |
| 2019/0124625 | A1 * | 4/2019 | Takeda | H04W 48/10 |

(Continued)

FOREIGN PATENT DOCUMENTS

CN 101925077 A 12/2010
CN 102404857 A 4/2012
(Continued)

OTHER PUBLICATIONS

State Intellectual Property Office of the People's Republic of China, Office Action and Search Report Issued in Application No. 201880001305.0, dated Oct. 9, 2021, 21 pages. (Submitted with Machine/Partial Translation).

(Continued)

*Primary Examiner* — Sithu Ko
(74) *Attorney, Agent, or Firm* — Arch & Lake LLP

(57) ABSTRACT

A method of transmitting information, applicable to a base station, comprising: determining a blank resource in a preset paging downlink control information (DCI) resource; loading preset information into the blank resource to form an enhanced paging DCI; and transmitting information to user equipment (UE) through the enhanced paging DCI. A computer-readable storage medium and a base station are further provided.

19 Claims, 5 Drawing Sheets

(56) References Cited

U.S. PATENT DOCUMENTS

| | | | |
|---|---|---|---|
| 2020/0037184 A1* | 1/2020 | Harada | H04L 5/0053 |
| 2020/0163050 A1* | 5/2020 | Lee | H04W 48/12 |
| 2021/0045098 A1* | 2/2021 | Bi | H04W 68/02 |
| 2021/0058214 A1* | 2/2021 | Chen | H04W 68/02 |

FOREIGN PATENT DOCUMENTS

| | | |
|---|---|---|
| CN | 106211329 A | 12/2016 |
| CN | 108023671 A | 5/2018 |
| CN | 108024331 A | 5/2018 |
| WO | 2017091992 A1 | 6/2017 |

OTHER PUBLICATIONS

Intellectual property India, Office Action Issued in Application No. 202147004038, dated Jan. 10, 2022, (5 pages).

International Search Report of PCT Application No. PCT/CN2018/094438 dated Mar. 26, 2019 with English translation (4p).

Qualcomm Incorporated, "Paging Design Consideration", 3GPP TSG-RAN WG1 Meeting #92bis, Sanya, China, R1-1804777, Apr. 16-20, 2018, (5p).

Ericsson, "Paging in DCI only", 3GPP TSG-RAN WG2 #101-Bis, Sanya, China, Tdoc R2-1804734 (Revision of R2-1802340), Apr. 16-20, 2018, (3p).

LG Electronics, "MIB-NB skipping and System information acquisition latency enhancement", 3GPP TSG RAN WG1 Meeting 92, Athens, Greece, R1-1802172, Feb. 26-Mar. 2, 2018, (7p).

State Intellectual Property Office of the People's Republic of China, Office Action and Search Report Issued in Application No. 201880001305.0, dated May 24, 2021, (Submitted with Machine/Partial Translation), (14p).

Extended European Search Report Issued in EP Application No. 18925440.2, dated May 27, 2021, (11p).

ISA State Intellectual Property Office of the People's Republic of China, Written Opinion of the International Searching Authority Issued in Application No. PCT/CN2018/094438, dated Mar. 26, 2019, (8p).

Huawei, HiSilicon, "Offline summary for AI 7.1.1.3 on Paging", 3GPP TSG RAN WGI Meeting #92bis, Sanya, China, RI-1805679, Apr. 16-20, 2018, (4p).

* cited by examiner

METHOD AND DEVICE OF TRANSMITTING INFORMATION AND BASE STATION

CROSS-REFERENCE TO RELATED APPLICATIONS

The present application is the US national phase of a PCT international application under PCT/CN2018/094438, filed on Jul. 4, 2018, the content of which is incorporated herein by reference in its entirety for all purposes.

TECHNICAL FIELD

Embodiments of the present disclosure relates to methods, devices of transmitting information and base stations.

BACKGROUND

User equipment (UEs) is informed of paging notifications through paging downlink control information (DCI). In the discussion of the 3GPP New Radio (NR) standard, the paging DCI may include 4 parts, namely: indicating bits, scheduling information, short message (i.e., direct indication short message) and reserved bits. In actual application scenarios, the probability that paging DCI carries both scheduling information and a short message at the same time is relatively small, resulting in blank resources in paging DCI in most cases, which is waste of resources. Especially in a case that the paging DCI does not carry scheduling information, it will cause a waste of resources for carrying the scheduling information, which wastes valuable air interface resources.

SUMMARY

According to the first aspect of the present disclosure, there is provided a method of transmitting information, which is applied to a base station, and the method includes:
  determining a blank resource in a preset paging downlink control information (DCI) resource;
  loading preset information into the blank resource to form an enhanced paging DCI; and
  transmitting, to the UE, information through the enhanced paging DCI.

According to a second aspect of the present disclosure, there is provided a device for transmitting information, which is applicable to a base station, and the device includes:
  a resource determining module, configured to determine a blank resource in a preset paging downlink control information (DCI) resource;
  an information loading module, configured to load preset information into the blank resource to form an enhanced paging DCI; and
  a transmitting module, configured to transmit, to user equipment (UE), information through the enhanced paging DCI.

According to a third aspect of the present disclosure, there is provided a non-transitory computer-readable storage medium having computer instructions stored thereon, wherein, in a case that the computer instructions being executed by a processor, operations of any of the methods described in the first aspect are implemented.

According to a fourth aspect of the present disclosure, there is provided a base station, including:
  a processor; and
  a memory, configured to store processor executable instructions;
  wherein, the processor is configured to:
  determine a blank resource in a preset paging downlink control information (DCI) resource;
  load preset information into the blank resource to form an enhanced paging DCI; and
  transmit, to user equipment (UE), information through the enhanced paging DCI.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, illustrate embodiments in accordance with the present invention, and the specification are used along with to explain the principle of the present invention.

DETAILED DESCRIPTION OF THE EMBODIMENTS

Figure 1:
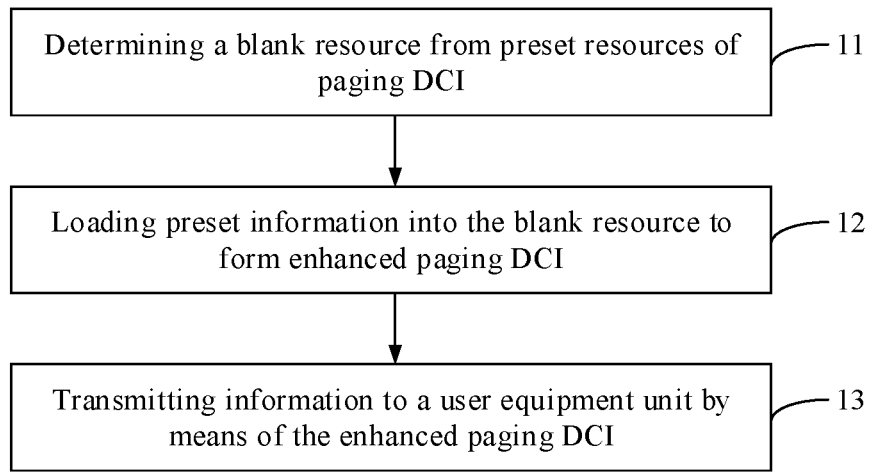
FIG. 1 illustrates a flow chart of a method of transmitting information according to an exemplary embodiment of the present disclosure.

The exemplary embodiments will be described in detail here, and examples thereof are illustrated in the accompanying drawings. When the following description refers to the accompanying drawings, unless otherwise indicated, the same numbers in different drawings designates the same or similar element. The implementation manners described in the following exemplary embodiments do not represent all implementation manners consistent with the present disclosure. Rather, they are merely examples of devices and methods consistent with some aspects of the present invention as described in detail in the appended claims.

The executive body involved in the present disclosure includes: a base station and user equipment (UE), where the base station may be a base station or a sub-base station provided with a large-scale antenna array. The UE may be a user terminal, a user node, a mobile terminal or a tablet computer, etc. In specific implementation process, the base station and the UE are independent of each other, and at the same time they are connected to each other to jointly implement the technical solutions according to the present disclosure.

The terms used in the present disclosure are only for the purpose of describing specific embodiments, and are not intended to limit the present disclosure. The singular forms "a", "said" and "the" used in the present disclosure and appended claims are also intended to include plural forms, unless the context clearly indicates other meanings. It should also be understood that the term "and/or" used herein refers to and includes any or all possible combinations of one or more associated listed items.

It should be understood that although the terms "first", "second", "third", etc. may be used in this disclosure to describe various information, the information should not be limited to these terms. These terms are only used to distinguish the same type of information from each other. For example, without departing from the scope of the present disclosure, the first information may also be referred to as second information, and similarly, the second information may also be referred to as first information. Depending on the context, the word "if" as used herein can be interpreted as "when" or "in a case of" or "in response to determination".

The executive body involved in the present disclosure includes: base stations and user equipment (UE) of a 5G network, where the base station may be a base station or a sub-base station provided with a large-scale antenna array. The UE may be a user terminal, a user node, a mobile terminal, or a tablet computer. In the specific implementation process, the base station and the UE are independent of each other, and at the same time they are connected to each other to jointly implement the technical solutions provided by the present disclosure.

The present disclosure relates to a method of transmitting information, which may be applicable to a base station of a 5G NR network, to effectively use idle resources in a preset paging DCI to transmit cell-level information, thereby avoiding resource waste.

Referring to FIG. 1, which illustrates a flowchart of a method of transmitting information according to an exemplary embodiment of the present disclosure, the method may include:

In step 11, a blank resource in a preset paging DCI resource is determined.

In the 5G NR system, paging DCI format is defined, and resources are divided into four parts according to the paging DCI format, and in each part, the number of bits and paging information units carried therein are preset.

Figure 2:
FIG. 2 illustrates a schematic structural view of paging DCI resources according to an exemplary embodiment of the present disclosure.

Referring to FIG. 2, which illustrates a schematic structural view of the paging DCI resource according to an exemplary embodiment of the present disclosure, the paging DCI resource may be divided into four regions: an indication region 100, a first region 101, a second region 102, and a reserved bit region 103.

The indication region usually occupies the first 2 bits to indicate that the DCI belongs to the paging DCI. The indication region is further used to indicate a type of the paging message.

The first region 101 occupies a preset number of bits, such as 8 bits, to carry direct indication short message. The direct indication short message includes: a message to notify the UE of update of system information for the UE, and a message to notify the UE to receive Earthquake and Tsunami Warning System (ETES) information, a message to notify the UE to receive Commercial Mobile Alert Service (CMAS) information or the like.

The second region 102 occupies a preset number of bits to carry service paging scheduling information for the UE.

The reserved bit region 103 is remaining resource bits in a preset information transmitting unit other than the fixed-length paging DCI resource. The preset information transmitting unit may be a frame, a sub-frame, a time slot, a mini-slot, and the like. In the embodiment of the present disclosure, it is assumed that the reserved bit region 103 occupies 4 bits.

In a case of transmitting paging messages through the air interface, a base station packages pagings for UEs with a same paging occasion (PO, Paging Occasion) into a paging message, and loads it into a paging DCI resource.

As described above, the probability that both direct indication short message and service paging scheduling information are simultaneously carried in a paging DCI resource is small, which results in blank resources in the paging DCI resource in most cases.

In the present disclosure, the base station may determine a blank resource in the paging DCI resource according to the paging information unit to be carried in the paging DCI resource.

Figure 3:
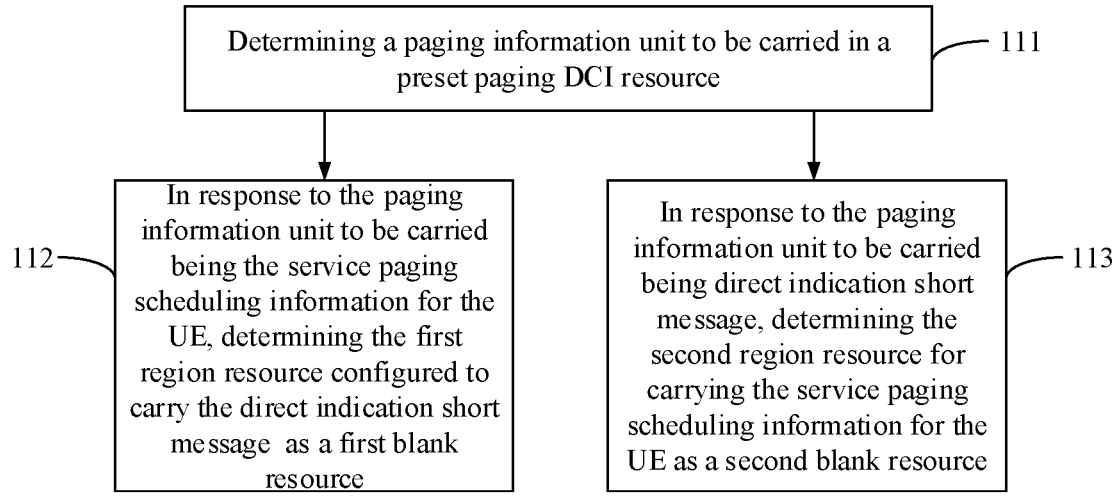
FIG. 3 illustrates a flowchart of a method of transmitting information according to another exemplary embodiment of the present disclosure.

Referring to FIG. 3, which illustrates a flowchart of a method of transmitting information according to another exemplary embodiment, the Step 11 may include:

In step 111, a paging information unit to be carried in a preset paging DCI resource is determined.

In the present disclosure, during a paging cycle, the paging information unit to be transmitted to the UE, by the base station and through a paging DCI resource, may include at least one of followings: direct indication short message, and service paging scheduling information for the UE.

In step 112, in response to the paging information unit to be carried being the service paging scheduling information for the UE, the first region resource configured to carry the direct indication short message is determined as a first blank resource;

In the present disclosure, after determining the paging information unit to be carried in the DCI paging resource, the base station may determine the blank resource in the preset paging DCI resource according to the paging information unit to be carried.

Figure 4A:
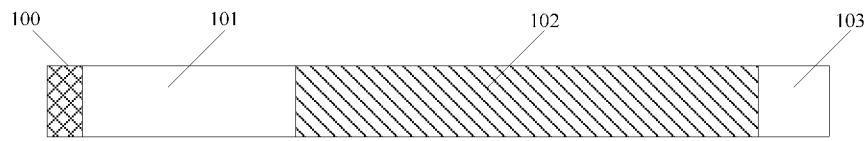
FIG. 4A illustrates a schematic view of configuration of paging DCI resources according to an exemplary embodiment of the present disclosure.

Refer to FIG. 4A, which illustrates a schematic diagram of a paging DCI resource configuration according to an exemplary embodiment of the present disclosure. In response to the paging information unit to be carried in a DCI resource being the service paging scheduling information for the UE, a resource of the first region 101 is determined as a blank resource, which may be referred to as a first blank resource in the present disclosure.

In step 113, in response to the paging information unit to be carried being direct indication short message, the second region resource for carrying the service paging scheduling information for the UE is determined as a second blank resource.

Figure 4B:
FIG. 4B illustrates a schematic view of configuration of paging DCI resources according to another exemplary embodiment of the present disclosure.

Similarly, referring to FIG. 4B, which illustrates a schematic diagram of another paging DCI resource configuration according to an exemplary embodiment of the present disclosure, in response to the paging information unit to be carried in a DCI resource being direct indication short message such as a system information update notification, a resource of the second region 102 is determined as a blank resource, which may be referred to as a second blank resource in the present disclosure.

In another embodiment of the present disclosure, the base station may determine the first blank resource or the second blank resource along with reserved bits in the preset paging DCI resource, that is, a resource occupied by the reserved bit region 103, as a blank resource of the preset paging DCI resource.

In step 12, a preset information is load into the blank resource to form an enhanced paging DCI.

In the present disclosure, after determining a blank resource in the preset DCI resource, the base station may load preset information into the blank resource, so that the preset DCI resource carries more information and air interface resources is effectively utilized.

The preset information may be high-level information. The high-level information refers to information, for example, specific content of the system update information, generated by a network layer above the physical layer of the communication protocol, such as a data link layer, a transport layer, etc.

In the present disclosure, the preset information may further be cell-level service information, such as commercial advertisements, broadcast information for cell users, and the like.

In the present disclosure, the base station may determine a type of the preset information according to a blank resource type and a preset protocol.

Figure 5:
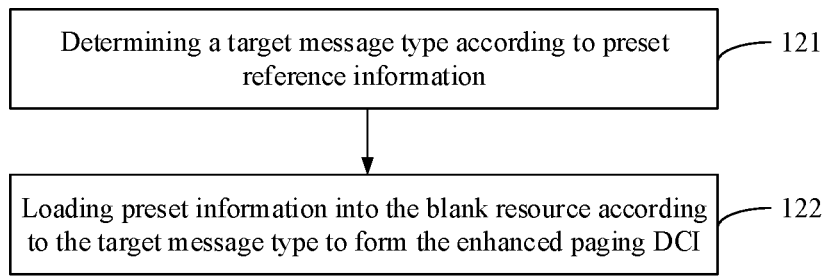
FIG. 5 illustrates a flowchart of a method of transmitting information according to another exemplary embodiment of the present disclosure.

Referring to FIG. 5, which illustrates a flowchart of another method of transmitting information according to an exemplary embodiment of the present disclosure, the step 12 may include:

In step 121, a target message type is determined according to preset reference information, the preset reference information includes: a blank resource type and/or the paging information unit to be carried, and the target message type is a message type of preset information to be loaded.

In the present disclosure, the 5G NR system can configure a correspondence between the blank resource type of the paging DCI resource and the type of information to be loaded. Exemplary, as illustrated in Table I:

TABLE I

| Blank Resource Type | Target Message Type |
| --- | --- |
| First blank resource | Cell-level service information |
| Second blank resource | Cell-level service information or system information to be updated |

Then, the base station may determine a target information type for the blank resource by querying the Table 1 according to the blank resource determined in step 11.

In an embodiment of the present disclosure, the 5G NR system may further determine a message type of information to be loaded into the second blank resource according to the paging information unit to be carried in the first region. Exemplary, as illustrated in Table II:

TABLE II

| Paging Information Unit To Be Carried | Target Message Type |
| --- | --- |
| of System Information Update Notification | System information to be updated |
| Other Information | Cell-level service information |

In another embodiment of the present disclosure, in response to determining that the blank resource in the paging DCI resource belongs to the second blank resource as illustrated in FIG. 4B, the base station may further determine the target message type by querying the Table II based on the paging information unit to be carried in the first region.

For example, in response to the paging information unit to be carried in the first region being a system information update notification, it can be known by querying the Table II that a corresponding target message type is system information to be updated, that is, update content of the system information.

In step 122, preset information is loaded into the blank resource according to the target message type to form the enhanced paging DCI.

As in the above example, the base station may load preset information of the target message type into the blank resource according to the target message type.

As in the above example, in response to the blank resource determined by the base station including the first blank resource, cell-level service information may be loaded into the first blank resource.

Similarly, in a case that the blank resource determined by the base station includes the second blank resource, and system information update notification is loaded into the first region 101, the system information to be updated, that is, update content of the system information, may be loaded into the second blank resource.

Regarding implementation of the step 122, there may be at least two cases:

In a first case, data volume of the preset information to be loaded is determined according to an available size of the blank resource.

Figure 6:
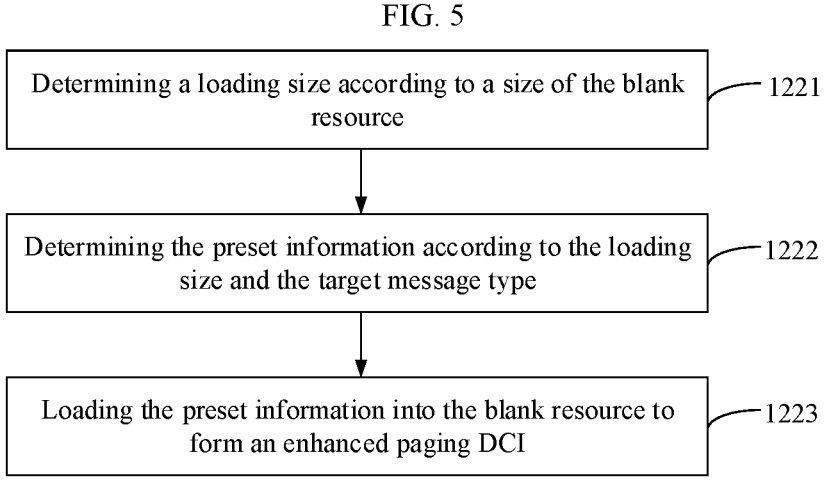
FIG. 6 illustrates a flowchart of a method of transmitting information according to another exemplary embodiment of the present disclosure.

Referring to FIG. 6 which illustrates a flowchart of another method of transmitting information according to an exemplary embodiment, the foregoing step 122 may include:

In step 1221, a loading size is determined according to an available size of the blank resource;

In the present disclosure, after determining the target message type, the base station may further determine a loading size according to an available size of the blank resource. In an embodiment of the present disclosure, an available size of the blank resource may be equal to that of the first blank resource or the second blank resource.

In another embodiment of the present disclosure, an available size of the blank resource may be equal to a sum of a size of the second blank resource and the number of preset reserved bits; or, the available size of the blank resource is equal to a sum of a size of the first blank resource and the number of preset reserved bits. The number of preset reserved bits refers to the number of bits occupied by the preset reserved bit region 103.

For example, in a case that the blank resource is the second blank resource, assuming that the system configures that the second blank resource occupies 30 bits, the base station may determine that a loading size is 30 bits.

In another embodiment of the present disclosure, the blank resources may further include a resource of the reserved bit region 103. Assuming that the reserved bit region occupies 4 bits, a size of the information to be loaded may be equal to a sum of the second blank resource and the resource of the reserved bit region, that is, the loading size is 34 bits.

In step 1222, the preset information is determined according to the loading size and the target message type;

So far, the base station may determine content of the preset information according to the determined target message type of the information to be loaded and the loading size.

As illustrated in the application scenario illustrated in FIG. 4B, taking the target message type being cell-level service information as an example, the base station may determine to load preset information of 34 bits to the blank resource, so as to maximize the utilization of idle resources to transmit information as much as possible to avoid waste of resources.

Figure 7:
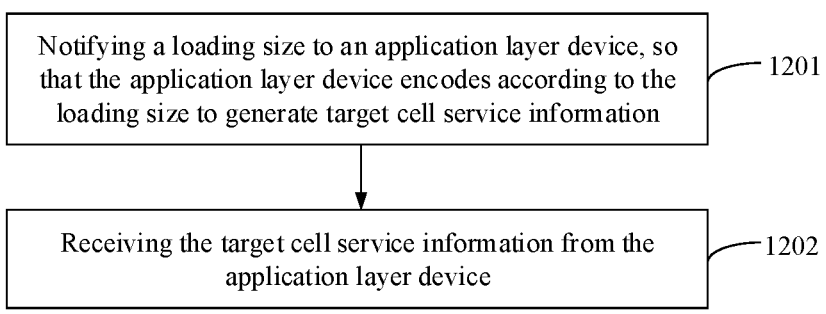
FIG. 7 illustrates a flowchart of a method of transmitting information according to another exemplary embodiment of the present disclosure.

In an embodiment of the present disclosure, in a case that the target message type belongs to cell-level service information that requires to be coded by an application layer device, referring to FIG. 7 which illustrates a flowchart of a method of transmitting information according to another exemplary embodiment of the present disclosure, the step 1222 may include:

in step 1201, a loading size is notified to an application layer device, so that the application layer device encodes according to the loading size to generate target cell service information; and in step 1202, the target cell service information is received from the application layer device.

In the embodiments of the present disclosure, in a case that the target message type belongs to cell-level service information that requires to be coded by an application layer device, such as commercial advertisements for cell users, cell-level multicast information, such as notification information for cell users, community information broadcasts, etc., the base station can further notify the application layer device to encode, so as to flexibly utilize the paging DCI idle resources.

In step 1223, the preset information is loaded into the blank resource to form an enhanced paging DCI.

In the second case, a preset information that matches an available size of the blank resource is determined according to the available size of the blank resource.

Figure 8:
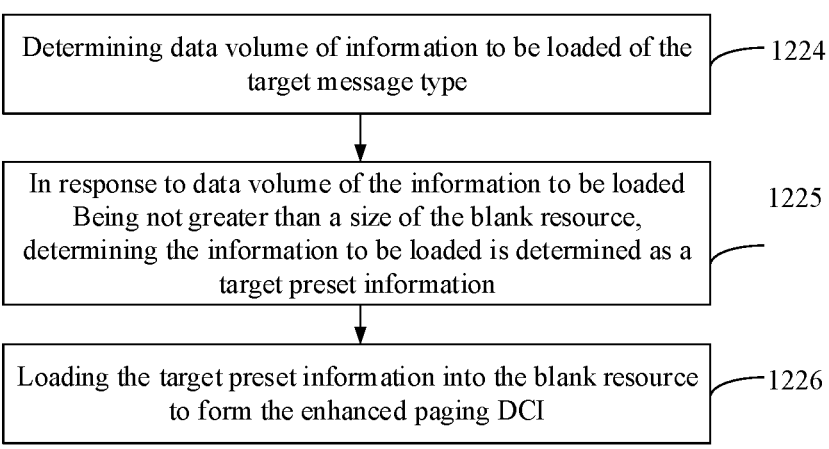
FIG. 8 illustrates a flowchart of a method of transmitting information according to another exemplary embodiment of the present disclosure.

Referring to FIG. 8, which illustrate a flowchart of a method of transmitting information according to another exemplary embodiment of the present disclosure, the step 122 may include:

In step 1224, data volume of information to be loaded of the target message type is determined;

In the embodiment of the present disclosure, after the base station determining the target message type, for the target message type, the system specifies that the preset information that may be loaded is also preset, that is, content and size of the preset information that may be loaded are predetermined. Assuming that the target message type is high-level information, taking the target message type comprising three preset information as an example, a correspondence between an identifier of each preset information and data volume may be illustrated in Table III:

TABLE III

| Preset Information Identifier | Data Volume |
|---|---|
| First Information | 8 bits |
| Second Information | 16 bits |
| Third Information | 30 bits |

In step 1225, in response to data volume of the information to be loaded being not greater than an available size of the blank resource, the information to be loaded is determined as a target preset information.

In the present disclosure, the available size of the blank resource may be compared with the data volume of the information to be loaded so as to determine target preset information that can be loaded into the blank resource.

The available size of the blank resource is similar to the first case as described above. In an embodiment of the present disclosure, in a case that the blank resource determined in the step 11 includes the first blank resource, an available size of the blank resource may be equal to a size of the first blank resource, or an available size of the blank resource is equal to a sum of a size of the first blank resource and a size of a resource of the reserved bit region 103. It is still assumed that the first region 101 is of 8 bits, and the reserved bit region 103 occupies 4 bits; then, in the embodiment of the present disclosure, the available size of the blank resource of paging DCI resource that the base station can use is 8 bits or 12 bits.

It is known by querying the Table III according to the available size of the blank resource that, the first information may be determined as the target preset information.

Similarly, in another embodiment of the present disclosure, in a case that the blank resource includes the second blank resource, a size of the corresponding blank resource is 30 bits, or 34 bits. It is known by querying the Table III that, any one of the preset information, that is, the first information, the second information, or the third information, which are preset, may be determined as the target preset information. In another embodiment of the present disclosure, the third information may be determined as the target preset information based on a principle of maximizing resource utilization, thereby improving the utilization of idle resources and reducing resource waste.

In step 1226, the target preset information is loaded into the blank resource to form the enhanced paging DCI.

In the embodiments of the present disclosure, in a case that the system presets designated information for the target message type, the base station may determine the target preset information to be loaded according to the available size of the blank resource, which improves flexible configuration of idle resources by the base station, and realizes effective use of the air interface resource.

In step 13, information is transmitted to the UE through the enhanced paging DCI.

In the present disclosure, the base station may transmit information to the UE within the cell through the enhanced paging DCI loaded with the preset information.

Correspondingly, the UE detects the enhanced paging DCI in a paging occasion, and determines the paging information unit and preset information by analyzing the enhanced paging DCI according to a system protocol.

In summary, through the method of transmitting information according to the present disclosure, in a case that there are blank resources in the preset paging DCI resources, that is, in an application scenario that the system information update notification and the service paging scheduling information for the UE are not carried in the preset paging DCI resource at the same time, the base station use the blank resource in the paging DCI resources to carry preset information, and deliver it to the UE, thereby avoiding waste of resources and enhancing the utilization of air interface resources by the system.

For the foregoing method embodiments, for the sake of simple description, they are all expressed as a combination of actions in sequence, but one of ordinary skill in the art should know that the present disclosure is not limited by the described sequence of actions, and some steps may be performed in other order or simultaneously according to the present disclosure.

Secondly, one of ordinary skill in the art should further know that the embodiments described in the specification are all optional embodiments, and the actions and modules involved in the embodiments are not necessarily required by the present disclosure.

Corresponding to the method embodiments for implementing the application functions, the present disclosure further provides device embodiments and corresponding terminal embodiments for implementing the application functions.

Correspondingly, embodiments of the present disclosure provide a device for transmitting information, which is applicable to a base station.

Figure 9:
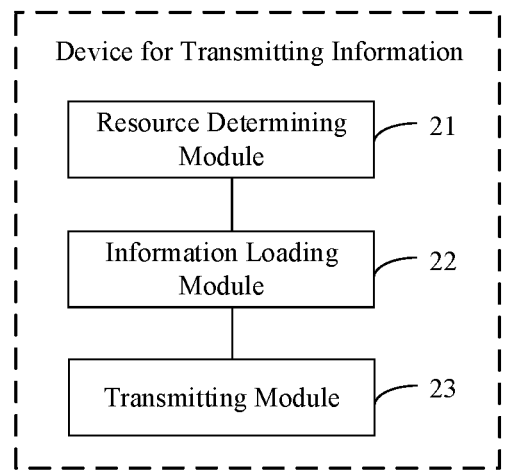
FIG. 9 illustrates a block diagram of a device for transmitting information according to an exemplary embodiment of the present disclosure.

Referring to FIG. 9, which illustrates a block diagram of a device for transmitting information according to an exemplary embodiment, the device may include:
a resource determining module 21, configured to determine a blank resource in a preset paging downlink control information (DCI) resource;
an information loading module 22, configured to load preset information into the blank resource to form an enhanced paging DCI;
in an embodiment of the present disclosure, the preset information may include: high-level information, or cell-level service information;
a transmitting module 23, configured to transmit information to the UE through the enhanced paging DCI.

Figure 10:
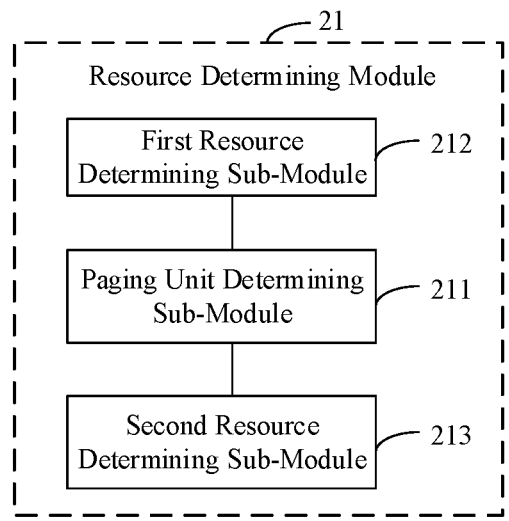
FIG. 10 illustrates a block diagram of a device for transmitting information according to another exemplary embodiment of the present disclosure.

Referring to FIG. 10, which illustrates a block diagram of a device for transmitting information according to an exemplary embodiment of the present disclosure, based on the device embodiment illustrated in FIG. 9, the resource determining module 21 may include:
a paging unit determining sub-module 211, configured to determine a paging information unit to be carried in the preset paging DCI resource;
a first resource determining sub-module 212, configured to determine a first region resource for carrying direct indication short message as a first blank resource in response to the paging information unit to be carried being service paging scheduling information for the UE;
a second resource determining sub-module 213, configured to determine a second region resource for carrying service paging scheduling information for the UE as a second blank resource in response to the paging information unit to be carried being direct indication short message.

Figure 11:
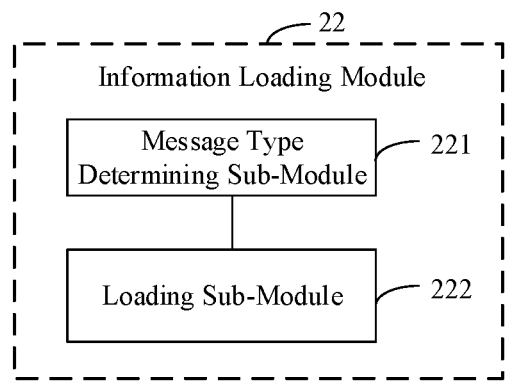
FIG. 11 illustrates a block diagram of a device for transmitting information according to another exemplary embodiment of the present disclosure.

Referring to FIG. 11, which illustrates a block diagram of another device for transmitting information according to an exemplary embodiment of the preset disclosure. Based on the device embodiment illustrated in FIG. 9, the information loading module 22 may include:
a message type determining sub-module 221, configured to determine a target message type according to preset reference information, the preset reference information including: blank resource type, and/or, the paging information unit that needs to be carried; the target message type being the message type of the preset information to be loaded;
a loading sub-module 222, configured to load the preset information into the blank resource according to the target message type to form the enhanced paging DCI.

Figure 12:
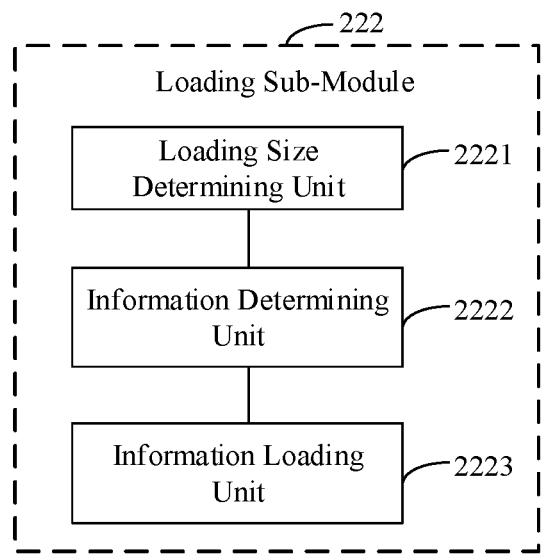
FIG. 12 illustrates a block diagram of a device for transmitting information according to another exemplary embodiment of the present disclosure.

Referring to FIG. 12, a block diagram illustrating another apparatus for transmitting information according to an exemplary embodiment, based on the apparatus embodiment illustrated in FIG. 11, the loading sub-module 222 may include:
a loading size determining unit 2221, configured to determine a loading size according to the available size of the blank resource;
an information determining unit 2222, configured to determine the preset information according to the amount of information to be loaded and the target message type;
an information loading unit 2223, configured to load the preset information into the blank resource to form the enhanced paging DCI.

Figure 13:
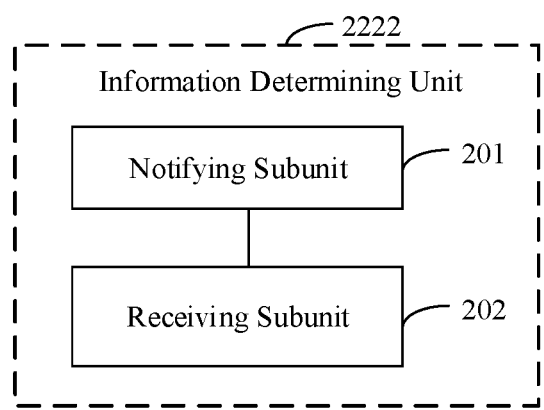
FIG. 13 illustrates a block diagram of a device for transmitting information according to another exemplary embodiment of the present disclosure.

In a device according to another embodiment of the present disclosure, in a case that the target message type determined by the message type determining sub-module 221 is cell-level service information, referring FIG. 13 which illustrates a block diagram of a device of transmitting information according to another exemplary embodiment, based on the device as illustrated in FIG. 12, the information determining unit 2222 may include:
a notifying subunit 201, configured to notify an application layer device of a size of information to be loaded, so that the application layer device encodes according to the loading size to generate target cell service information; and
a receiving subunit 202, configured to receive the target cell service information from the application layer device.

Figure 14:
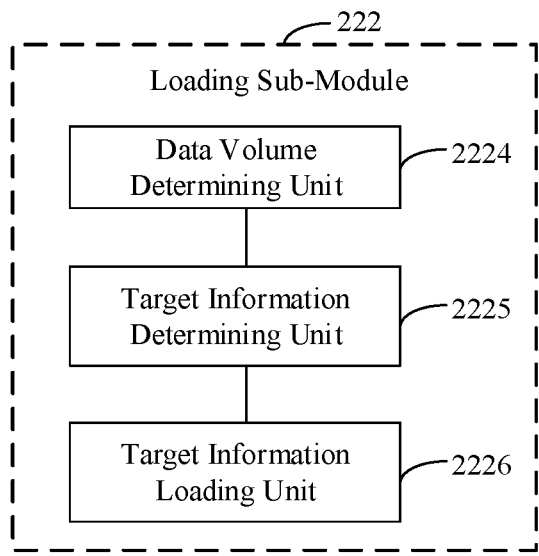
FIG. 14 illustrates a block diagram of a device for transmitting information according to another exemplary embodiment of the present disclosure.

Referring to FIG. 14 which illustrates a block diagram of a device for transmitting information according to another exemplary embodiment of the present disclosure, based on the device as illustrated in FIG. 11, the loading sub-module 222 may include:
a data volume determining unit 2224, configured to determine data volume of the information to be loaded corresponding to the target message type;
a target information determining unit 2225, configured to determine the information to be loaded as target preset information in a case that the data volume of the information to be loaded is not greater than an available size of the blank resource; and a target information loading unit 2226, configured to load the target preset information into the blank resource to form the enhanced paging DCI.

In the device embodiments of the present disclosure, the available size of the blank resource is equal to a sum of a size of the second blank resource and a number of the preset reserved bits; or, an available size of the blank resource is equal to a sum of a size of the first blank resource and a number of the preset reserved bits.

In an embodiment of the present disclosure, in response to the direct indication short message being a system information update notification, the information loading module 22 may be configured to load updated content of the system information into the blank resource to form an enhanced paging DCI; wherein the blank resource includes the second blank resource, or a sum of the second blank resource and a preset reserved bit region resource.

As for the device embodiments, since they basically correspond to the method embodiments, the relevant part can be referred to the part of the description of the method embodiment. The device embodiments described above are merely illustrative. The units described above as separate components may or may not be physically separated, and the components displayed as units may or may not be physical units, that is, they may be located at a place, or may be distributed over multiple network units. Some or all of the modules may be selected to achieve the objectives of the solutions of the present disclosure according to actual requirements. One of ordinary skill in the art can understand and implement it without any creative work.

Correspondingly, one aspect of the present disclosure provides a base station, including:
a processor;
memory, configured to store processor executable instructions;
wherein, the processor is configured to:
determine a blank resource in a preset paging DCI resource;
load preset information into the blank resource to form an enhanced paging DCI; and
transmit information to the UE through the enhanced paging DCI.

Figure 15:
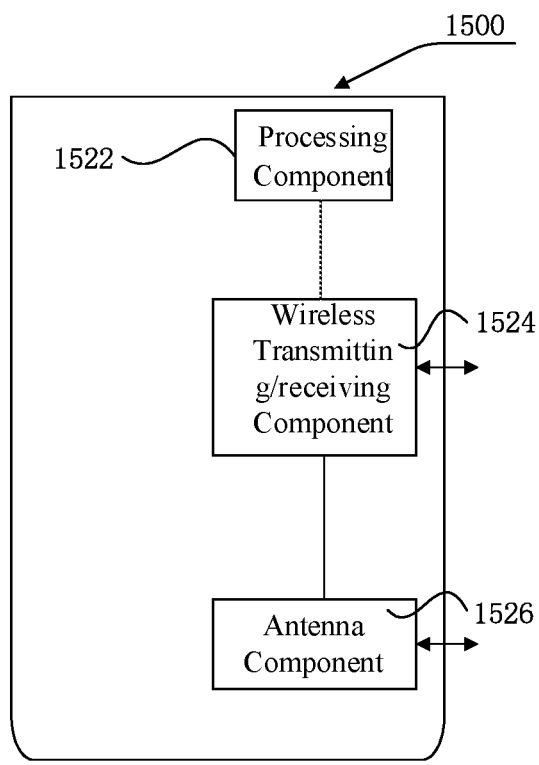
FIG. 15 illustrates a schematic structural diagram of a base station according to an exemplary embodiment of the present disclosure.

FIG. 15 illustrates a schematic structural diagram of a base station 1500 according to an exemplary embodiment. The base station may be applied to a 5G NR network. Referring to FIG. 15, the base station 1500 includes a processing component 1522, a wireless transmitting/receiving component 1524, an antenna component 1526, and a signal processing section specific to a wireless interface. The processing component 1522 may further include one or more processors.

One of the processors of the processing component 1522 may be configured to:
determine a blank resource in a preset paging DCI resource;
load preset information into the blank resource to form an enhanced paging DCI; and
transmit information to the UE through the enhanced paging DCI.

In one or more embodiments, there is further provided a non-transitory computer-readable storage medium including instructions on which computer instructions are stored. The computer instructions may be executed by the processing component 1522 of the base station 1500 to implement operations of any one of the methods of transmitting information as illustrated in FIGS. 1 to 8. For example, the non-transitory computer-readable storage medium may be ROM, random access memory (RAM), CD-ROM, magnetic tape, a floppy disk, an optical data storage device, etc.

In some embodiments of the present disclosure, determining the blank resource in the preset paging DCI resource includes:
determine a paging information unit to be carried in the preset paging DCI resource;
determining a first region resource for carrying a direct indication short message as a first blank resource in response to the paging information unit to be carried being service paging scheduling information for the UE; and
determining a second region resource for carrying the service paging scheduling information for the UE as a second blank resource in response to the paging information unit to be carried being the direct indication short message.

In some embodiments of the present disclosure, loading preset information into the blank resource to form the enhanced paging DCI includes:
determining a target message type according to preset reference information, the preset reference information includes: a blank resource type, and/or the paging information unit to be carried; the target message type is a message type of the preset information to be loaded; and
loading the preset information into the blank resource according to the target message type to form the enhanced paging DCI.

In some embodiments of the present disclosure, loading the preset information into the blank resource according to the target message type to form the enhanced paging DCI includes:
determining a loading size according to the available size of the blank resource;
determining the preset information according to the loading size and the target message type; and
loading the preset information into the blank resource to form the enhanced paging DCI.

In some embodiments of the present disclosure, in response to the target message type being cell-level service information, determining the preset information according to the loading size and the target message type includes:
notifying an application layer device of the loading size, so that the application layer device encodes according to the loading size to generate target cell service information; and
receiving the target cell service information from the application layer device.

In some embodiments of the present disclosure, loading the preset information into the blank resource according to the target message type to form the enhanced paging DCI includes:
determining data volume of the information to be loaded corresponding to the target message type;
determining the information to be loaded as the target preset information in response to the data volume of the information to be loaded being not greater than the available size of the blank resource; and
loading the target preset information into the blank resource to form the enhanced paging DCI.

In some embodiments of the present disclosure, the available size of the blank resource is equal to a sum of a size of the second blank resource and the number of preset reserved bits; or, the available size of the blank resource is equal to a sum of a size of the first blank resource and the number of the preset reserved number bits.

In some embodiments of the present disclosure, the preset information includes: high-level information, or cell-level service information.

In some embodiments of the present disclosure, in response to the direct indication short message being a system information update notification, loading the preset information into the blank resource to form the enhanced paging DCI includes:

loading updated content of the system information into the blank resource to form an enhanced paging DCI;
wherein the blank resource includes: the second blank resource, or a sum of the second blank resource and the preset reserved bit region resource.

In some embodiments of the present disclosure, the resource determining module includes:

a paging unit determining sub-module, configured to determine a paging information unit to be carried in the preset paging DCI resource;
a first resource determining sub-module, configured to determine, in response to the paging information unit to be carried being service paging scheduling information for the UE, a first region resource for carrying direct indication short message as a first blank resource; and
a second resource determining sub-module, configured to determine, in response to the paging information unit to be carried being the direct indication short message, a second region resource for carrying the service paging scheduling information for the UE as a second blank resource.

In some embodiments of the present disclosure, the information loading module includes:

a message type determining sub-module, configured to determine a target message type according to preset reference information, the preset reference information including a blank resource type and/or a paging information unit to be carried, and the target message type being a message type of the preset information to be loaded; and
a loading sub-module, configured to load the preset information into the blank resource according to the target message type to form the enhanced paging DCI.

In some embodiments of the present disclosure, the loading sub-module includes:

a loading size determining unit, configured to determine a loading size according to an available size of the blank resource;
an information determining unit, configured to determine the preset information according to the loading size and the target message type;
an information loading unit, configured to load the preset information into the blank resource to form the enhanced paging DCI.

In some embodiments of the present disclosure, in response to the target message type being cell-level service information, the information determining unit includes:

a notifying subunit, configured to notify an application layer device of the loading size, so that the application layer device encodes according to the loading size to generate target cell service information; and a receiving subunit, configured to receive the target cell service information from the application layer device.

In some embodiments of the present disclosure, the loading sub-module includes:

a data volume determining unit, configured to determine data volume of the information to be loaded corresponding to the target message type;
a target information determining unit, configured to determine, in response to the data amount of the information to be loaded being not greater than the available size of the blank resource, the information to be loaded as target preset information; and
a target information loading unit, configured to load the target preset information into the blank resource to form the enhanced paging DCI.

In some embodiments of the present disclosure, an available size of the blank resource is equal to a sum of a size of the second blank resource and the number of preset reserved bits; or, an available size of the blank resource is equal to a sum of the size of a first blank resource and the number of preset reserved bits.

In some embodiments of the present disclosure, the preset information includes: high-level information or cell-level service information.

In some embodiments of the present disclosure, the information loading module is configured to load updated content of the system information into the blank resource to form the enhanced paging DCI in response to the information carried by the direct indication short message being a system information update notification;

wherein the blank resource includes a second blank resource, or a sum of a second blank resource and a preset reserved bit region resource.

The technical solutions provided by the embodiments of the present disclosure may include the following beneficial effects:

In the embodiment of the present disclosure, in a case that there is a blank resource in the preset paging DCI resource, that is, in the application scenario where a preset paging DCI resource does not carry a system information update notification and service paging scheduling information for UE at the same time, the base station can use the blank resource in the paging DCI resource to carry preset information and transmit it to the UE, thereby avoiding wasting valuable air interface resource and enhancing the system's utilization of air interface resource.

After considering the specification and practicing the disclosure disclosed herein, one of ordinary skill in the art will easily conceive of other embodiments of the present disclosure. This application is intended to cover any variations, applications, or modifications of the present disclosure. These variations, applications, or modifications follow the general principles of the present disclosure and include common knowledge or conventional technical means in the technical field not disclosed in the present disclosure. The description and the embodiments are only regarded as exemplary, and the true scope and spirit of the present disclosure are defined by the appended claims.

It should be understood that the present disclosure is not limited to the exact structure that has been described above and illustrated in the drawings, and various modifications and changes may be made without departing from its scope. The scope of the present disclosure is only defined by the appended claims.

What is claimed is:

1. A method of transmitting information, applicable to a base station, comprising:
   determining a blank resource in a preset paging downlink control information (DCI) resource, the preset paging DCI resource is divided into following regions: (i) an indication region, (ii) a first region for carrying direct indication short message, (iii) a second region for carrying scheduling information for user equipment (UE), and (iv) a reserved bit region, wherein the blank resource comprises at least the first region or the second region;
   loading preset information into the blank resource to form an enhanced paging DCI; and
   transmitting information to the UE through the enhanced aging DCI.

2. The method according to claim 1, wherein determining the blank resource in the preset paging DCI resource comprises:
   determining a paging information unit to be carried in the preset paging DCI resource;
   determining the first region resource for carrying direct indication short message as a first blank resource in response to determining that the paging information unit is service paging scheduling information for the UE; or
   determining the second region resource for carrying the service paging scheduling information for the UE as a second blank resource in response to determining that the paging information unit is the direct indication short message.

3. The method according to claim 2, wherein in response to the direct indication short message being a system information update notification, loading the preset information into the blank resource to form the enhanced paging DCI comprises:
   loading updated content of the system information into the blank resource to form the enhanced paging DCI;
   wherein the blank resource comprises the second blank resource, or a sum of the second blank resource and a preset reserved bit region resource.

4. The method according to claim 1, wherein loading the preset information into the blank resource to form the enhanced paging DCI comprises:
   determining a target message type according to preset reference information, wherein the preset reference information comprises at least one of: a blank resource type, or the paging information unit to be carried, wherein the target message type is a message type of the preset information to be loaded; and
   loading the preset information into the blank resource according to the target message type to form the enhanced paging DCI.

5. The method according to claim 4, wherein loading the preset information into the blank resource according to the target message type to form the enhanced paging DCI comprises:
   determining a size of the information to be loaded according to an available size of the blank resource;
   determining the preset information according to the size of the information to be loaded and the target message type; and
   loading the preset information into the blank resource to form the enhanced paging DCI.

6. The method according to claim 5, wherein in response to the target message type being cell-level service information, determining the preset information according to the size of the information to be loaded and the target message type, comprises:
   notifying an application layer device of the size of the information to be loaded, wherein the application layer device is configured to encode the information to be loaded according to the size of the information to be loaded to generate target cell service information; and
   receiving the target cell service information from the application layer device.

7. The method according to claim 5, wherein the available size of the blank resource is equal to a sum of the size of the second blank resource and the number of preset reserved bits; or,
   the available size of the blank resource is equal to a sum of a size of the first blank resource and the number of preset reserved bits.

8. The method according to claim 4, wherein loading the preset information into the blank resource according to the target message type to form the enhanced paging DCI comprises:
   determining a size of the information to be loaded corresponding to the target message type;
   determining the information to be loaded as the target preset information in response to determining that the size of the information to be loaded is not greater than an available size of the blank resource; and
   loading the target preset information into the blank resource to form the enhanced paging DCI.

9. The method according to claim 1, wherein the preset information comprises: high-level information or cell-level service information.

10. A non-transitory computer-readable storage medium having computer instructions stored thereon, the instructions being executed by a processor to implement following operations:
    determining a blank resource in a preset paging downlink control information (DCI) resource, the preset paging DCI resource is divided into following regions: (i) an indication region, (ii) a first region for carrying direct indication short message, (iii) a second region for carrying scheduling information for user equipment (UE), and (iv) a reserved bit region, wherein the blank resource comprises at least the first region or the second region;
    loading preset information into the blank resource to form an enhanced paging DCI; and
    transmitting information to the UE through the enhanced aging DCI.

11. A base station, comprising:
    a processor configured to execute processor executable instructions; and
    a memory, configured to store processor executable instructions, the processor executable instructions comprising:
    determining a blank resource in a preset paging downlink control information (DCI) resource, the preset paging DCI resource is divided into following regions: (i) an indication region, (ii) a first region for carrying direct indication short message, (iii) a second region for carrying scheduling information for user equipment (UE), and (iv) a reserved bit region, wherein the blank resource comprises at least the first region or the second region;
    loading preset information into the blank resource to form an enhanced paging DCI; and transmitting information to the UE through the enhanced aging DCI.

12. The base station according to claim 11, wherein in a case that the processor is configured to determine the blank resource in the preset paging DCI resource, the processor executable instructions further comprises:
   determining a paging information unit to be carried in the preset paging DCI resource;
   determining the first region resource for carrying direct indication short message as a first blank resource in response to the paging information unit to be carried being service paging scheduling information for the UE; or
   determining the second region resource for carrying the service paging scheduling information for the UE as a second blank resource in response to the paging information unit to be carried being the direct indication short message.

13. The base station according to claim 12, wherein in a case that the processor is configured to load the preset information into the blank resource according to the target message type to form the enhanced paging DCI, the processor executable instructions further comprises:
   determining a size of the information to be loaded according to an available size of the blank resource;
   determining the preset information according to the size of the information to be loaded and the target message type; and
   loading the preset information into the blank resource to form the enhanced paging DCI.

14. The base station according to claim 13, wherein in response to the target message type being cell-level service information, and in a case that the processor is configured to determine the preset information according to the size of the information to be loaded and the target message type, the processor executable instructions further comprises:
   notifying an application layer device of the size of the information to be loaded, wherein the application layer device is configured to encode the information to be loaded according to the size of the information to be loaded to generate target cell service information; and
   receiving the target cell service information from the application layer device.

15. The base station according to claim 13, wherein the available size of the blank resource is equal to a sum of the size of the second blank resource and the number of preset reserved bits; or,
the available size of the blank resource is equal to a sum of a size of the first blank resource and the number of preset reserved bits.

16. The base station according to claim 12, wherein in response to the direct indication short message being a system information update notification, and in a case that the processor is configured to load the preset information into the blank resource to form the enhanced paging DCI, the processor executable instructions further comprises:
   loading updated content of the system information into the blank resource to form the enhanced paging DCI;
   wherein the blank resource comprises the second blank resource, or a sum of the second blank resource and a preset reserved bit region resource.

17. The base station according to claim 11, wherein in a case that the processor is configured to load the preset information into the blank resource to form the enhanced paging DCI, the processor executable instructions further comprises:
   determining a target message type according to preset reference information, wherein the preset reference information comprises at least one of: a blank resource type, or the paging information unit to be carried and wherein the target message type is a message type of the preset information to be loaded; and
   loading the preset information into the blank resource according to the target message type to form the enhanced paging DCI.

18. The base station according to claim 17, wherein in a case that the processor is configured to load the preset information into the blank resource according to the target message type to form the enhanced paging DCI, the processor executable instructions further comprises:
   determining a size of the information to be loaded corresponding to the target message type;
   determining the information to be loaded as the target preset information in response to the size of the information to be loaded being not greater than an available size of the blank resource; and
   loading the target preset information into the blank resource to form the enhanced paging DCI.

19. The base station according to claim 11, wherein the preset information comprises: high-level information or cell-level service information.

* * * * *